(12) United States Patent  
Lin

(10) Patent No.: US 8,044,563 B2  
(45) Date of Patent: Oct. 25, 2011

(54) LIGHT EMITTING UNIT AND CONDUCTIVE DEVICE THEREOF

(75) Inventor: Shue-Liang Lin, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 308 days.

(21) Appl. No.: 12/200,094

(22) Filed: Aug. 28, 2008

(65) Prior Publication Data

US 2009/0072742 A1   Mar. 19, 2009

(30) Foreign Application Priority Data

Sep. 13, 2007   (TW) .............................. 96215371 U

(51) Int. Cl.
*H01J 1/00* (2006.01)

(52) U.S. Cl. .................... 313/237; 313/623; 313/624

(58) Field of Classification Search .................. 313/237, 313/623, 634
See application file for complete search history.

(56) References Cited

U.S. PATENT DOCUMENTS

| 6,078,136 | A  | * | 6/2000 | Sica ............................... 313/493 |
| 7,573,184 | B2 | * | 8/2009 | Ngai et al. ...................... 313/25 |
| 2006/0055293 | A1 | * | 3/2006 | Ngai et al. ...................... 313/25 |

* cited by examiner

*Primary Examiner* — Bumsuk Won

(74) *Attorney, Agent, or Firm* — Muncy, Geissler, Olds & Lowe, PLLC

(57) ABSTRACT

A light-emitting unit includes a light-emitting component, a conductive device and a power source. The light-emitting component includes at least one end. The conductive device includes a tubular body having an opening and detachably telescoped to the end of the light-emitting component, and at least one abutting portion protruding toward the light-emitting component for abutting against the light-emitting component. The conductive device is utilized to excite the light-emitting component to emit lights via the power source.

21 Claims, 9 Drawing Sheets

LIGHT EMITTING UNIT AND CONDUCTIVE DEVICE THEREOF

CROSS REFERENCE TO RELATED APPLICATIONS

This Application claims priority of filed in filed in Taiwan, Republic of China on Sep. 13, 2007, Patent Application No. 096215371, the entire contents of which are hereby incorporated by reference.

BACKGROUND OF THE INVENTION

1. Field of the Invention

The invention relates to a light-emitting unit and a conductive device thereof, and more particularly to a light-emitting unit providing a detachable conductive device.

2. Description of the Related Art

As illumination technology continues to advance, various illuminating or displaying equipment have been extensively applied in everyday life. One example is a liquid crystal display (LCD). LCDs, however, are not self-lighting display apparatuses. A light-emitting component provided must have lights for displaying images. In general, a cold cathode fluorescent lamp (CCFL) is used as a light-emitting element for LCD.

For a modern light tube, power cords for the light tube have been omitted. That is, a light mask is further provided to serve as a conductive device between a light tube and a light-tube bracket for electrical conduction.

In FIG. 1, a conventional light-emitting unit 1 includes a cold cathode fluorescent tube 10 having a distal end and a light mask 20 jacketed to the distal end of the cold cathode fluorescent tube 10. The cold cathode fluorescent tube 10 includes a glass tube 11, and an electrode 12 disposed in the glass tube 11, and a lead wire 13 connected to the electrode 12 and partially extended through the glass tube 11. The light mask 20 is adhered to the cold cathode fluorescent tube 10 by gluing and connected to the extended lead wire 13. The light mask 20, the lead wire 13 and the light-tube bracket are made of conductive material. When a power source is connected to the light-tube bracket, the electrode 12 is excited by the power source via the light mask 20 and the lead wire 13, thereby generating electrons to impact idle gas received in the glass tube 11, thus, resulting in ultra violet (UV) light. As the ultra violet light is absorbed by the fluorescent agent coated on the glass tube 11, a visible light is formed.

When the light-emitting unit 1 lights, the light mask 20, the lead wire 13 and the electrode 12 of the light-emitting unit 1 are continuously conducted, and heat is generated from the contact area between the light mask 20 and the glass tube 11, thus resulting in that the electrode 12 might be damaged or efficiency of the light-emitting unit 1 might be decreased. Once the light mask 20 is connected to the glass tube 11, the light mask 20 and the glass tube 11 cannot be separated from each other, i.e., the light mask 20 and the glass tube 11 must be changed as a whole, if the glass tube 11 malfunctions. It is not economical to change both the light mask 20 and the glass tube 11 of the light-emitting unit, should only one malfunction.

Thus, it is essential to provide a conductive device suitable for a light-emitting unit, and capable of simplifying the assembly/disassembly process and increasing heat dissipation efficiency.

BRIEF SUMMARY OF THE INVENTION

To solve the aforementioned problems, an object of the present invention is to provide a light-emitting unit and a conductive device thereof to simplify the assembly/disassembly process and increase heat dissipation efficiency.

To attain the above object, the present invention provides a conductive device for a light-emitting unit. The light-emitting unit includes a light-emitting component having at least one end. The conductive device includes a tubular body having an opening and detachably telescoped to the end of the light-emitting component of the light-emitting unit. At least one abutting portion protruding toward the light-emitting component is utilized to abut against the light-emitting component. A power source is utilized to excite the light-emitting component to emit lights.

To attain the above object, a light-emitting unit of the invention is provided. The light-emitting unit includes a light-emitting component, a conductive device and a power source. The light-emitting component includes at least one end. The conductive device includes a tubular body having an opening and detachably telescoped to the end of the light-emitting component and at least one abutting portion protruding toward the light-emitting component for abutting against the light-emitting component. The conductive device is utilized to excite the light-emitting component to emit lights via the power source.

Based on the described features, the light-emitting unit of the embodiment provides a detachably disposed conductive device on the light-emitting component. Thus, the conductive device or the light-emitting component can be individually replaced by a new one when the conductive device or the light-emitting component malfunctions. That is, unlike conventional light-emitting units, the light-emitting unit of the invention is more economical, as the entire light-emitting unit does not have to be replaced, should a malfunction occur in one part of the light-emitting unit. Further, due to the gap formed by the protrusions of the conductive device with respect to the light-emitting component, a space for heat dissipation is increased. Thus, the light-emitting unit of the embodiment increases heat dissipation efficiency and assures long usage lifespan.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
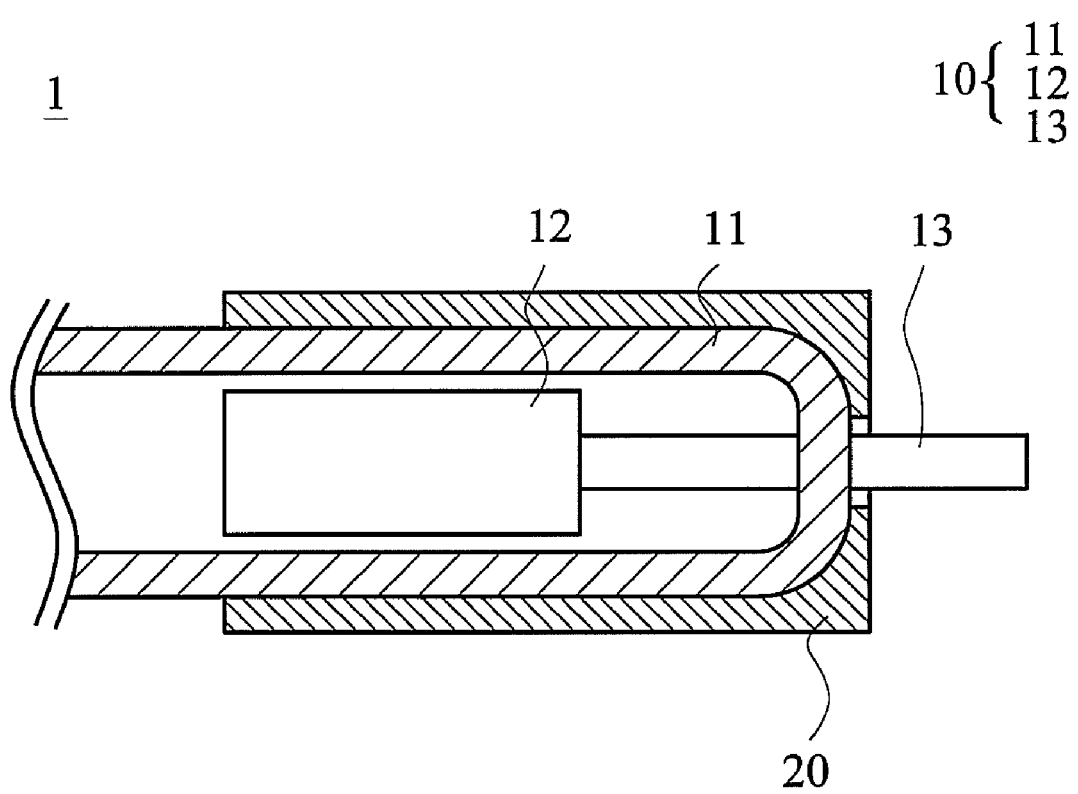
FIG. 1 is a schematic sectional view of a conventional light-emitting unit.
Figure 2A:
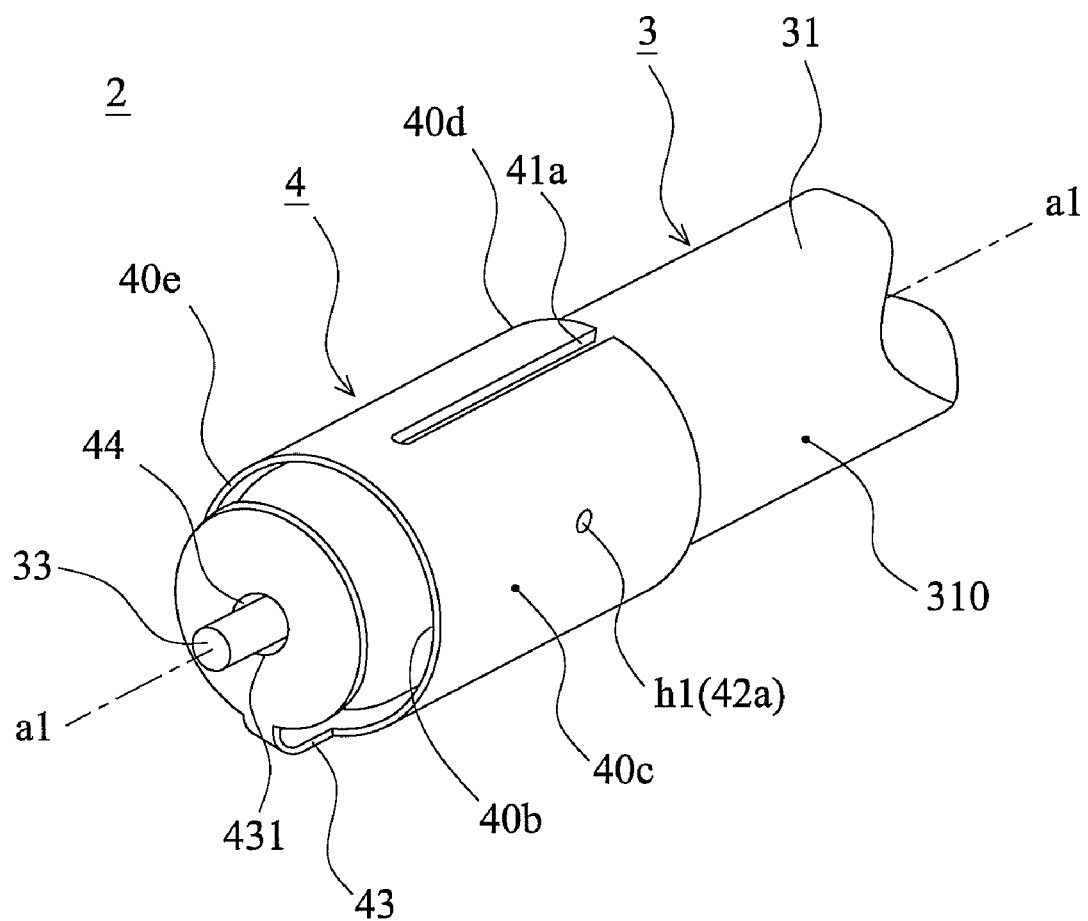
FIG. 2A is a partially schematic sectional view of a light-emitting unit of a first embodiment of the invention.
Figure 2B:
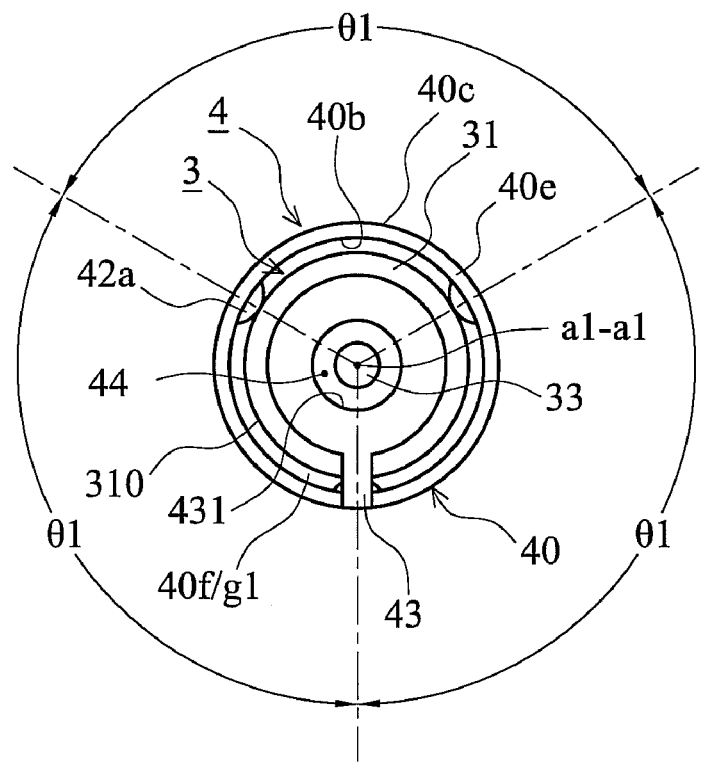
FIG. 2B is a front view of the light-emitting unit of FIG. 2A.
Figure 2C:
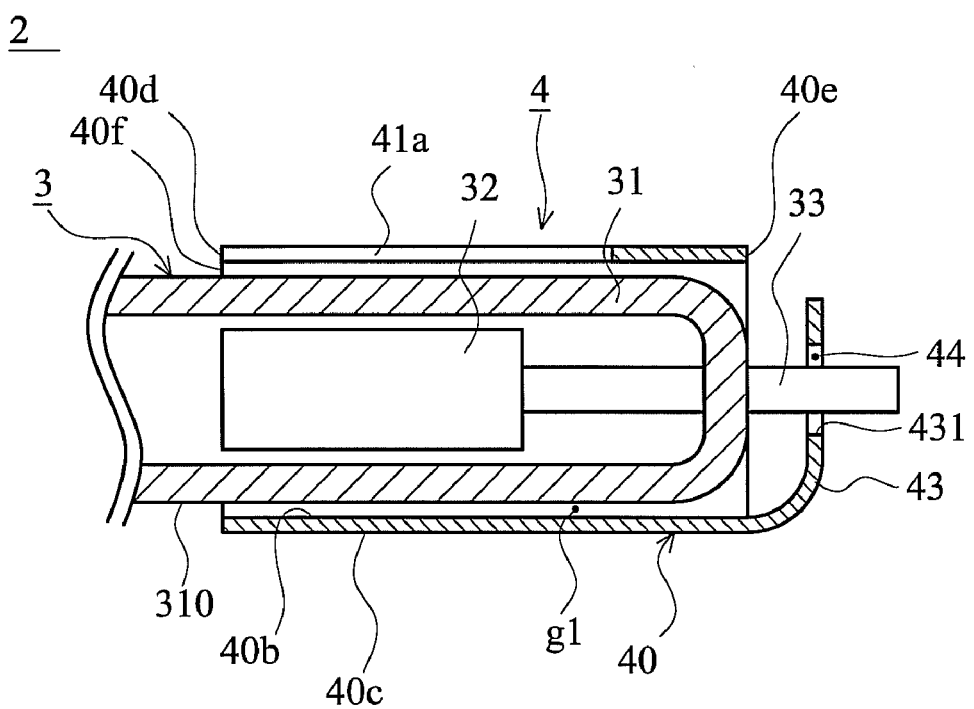
FIG. 2C is a sectional view of the light-emitting unit along an axial line (a1-a1) of FIG. 2A.

FIG. 2A is a partially schematic sectional view of a light-emitting unit 2 of a first embodiment, FIG. 2B is a front view of the light-emitting unit 2 of FIG. 2A, and FIG. 2C is a sectional view of the light-emitting unit 2 along an axial line a1-a1 of FIG. 2A.

Referring to FIGS. 2A-2C simultaneously, the light-emitting unit 2 includes a light-emitting component 3 and a conductive device 4. The conductive device 4 includes a tubular body 40 telescoped to the light-emitting component 3. The light-emitting component 3 includes a glass tube 31 having an outer surface 310, an electrode 32 disposed in the glass tube 31, and a lead wire 33 connected to the electrode 32 and extended to the outside of the glass tube 31. The electrode 32 disposed in the glass tube 31 is electrically connected to the conductive device 4 via the lead wire 33. In this embodiment, the light-emitting component 3 can be a gas discharge tube or a cold cathode fluorescent lamp.

The conductive device 4 includes a tubular body 40, a plurality of abutting portions 42a and a conducting portion 43. The tubular body 40 has an opening 41a, a first circumference 40b, a second circumference 40c, a first end 40d, a second end 40e, and a through hole 40f. The first and second circumferences 40b and 40c are inner and outer circumferences of the tubular body 40, respectively (inner and outer circumferences 40b and 40c hereinafter), and the through hole 40f is in the inner circumference 40b. The opening 41a is a straight slot formed along the axial line a1-a1 (the center axial direction of the conductive device 4) for allowing the conductive device detachably telescoped to the end of the light-emitting component 3. The opening 40a is formed along the axial line a1-a1 from the first end 40d penetrating the inner circumference 40b and the outer circumference 40c without penetrating the tubular body 40 completely, thereby forming the tubular body 40 with a flexible C-shaped sectional structure (shown in FIG. 2B). The conducting portion 43 extended from the second end 40e of the tubular body 40 is an L-shaped structure with a through hole 431 thereon.

By fitting the lead wire 33 of the light-emitting component 3 in the through hole 431 of the conducting portion 43, i.e., jacketing the conductive device 4 outside of the light-emitting component 3, an annular region 44 is formed between the conducting portion 43 and the lead wire 33 and a gap g1 is formed between the outer surface 310 of the glass tube 31 and the tubular body 40 by abutting the abutting portions 42 against the outer surface 310 of the glass tube 31. A welding flux (not shown) can be placed in the annular region 44 to connect the lead wire 33 and the conducting portion 43, and the generated heat from the light-emitting component 3 can be dissipated via the gap g1. Under the clamping by the C-shaped tubular body 40 and the abutting portions 42a, the conductive device 4 can be conveniently assembled to or dissembled from the glass tube 31 of the light-emitting component 3. In this embodiment, the conductive device 4 can be made of metallic material, the abutting portions 42a are three rounded protrusions which are formed by punched indents h1 on the outer circumference 40c, and any two of the rounded protrusions has an angle θ (120°) therebetween, but is not limited thereto. The conductive device 4 is utilized to excite the light-emitting component 30 to emit light via a power source (not shown in Figs.). Alternatively, a plurality of patching holes (not shown in Figs.) can be formed on the circumference of the conductive device 4 for dissipating the generated heat.

The light-emitting unit 2 further includes a clamping portion to clamp the conductive device 4 and conduct power from the power source. In this embodiment, the clamping portion is made of a conductive material. The light-emitting unit 2 further includes a displaying device having a backlight module, and the clamping portion is disposed on the backlight module of the displaying device. By engaging the conductive device 4 into the clamping portion, the electrode 32 is excited by the power source via the clamping portion, the conductive device 4 and the lead wire 33, thereby generating electrons to impact gas received in the glass tube 31, thus forming ultra violet (UV) light. As the ultra violet light is absorbed by the fluorescent agent coated on the glass tube 31, a visible light is formed.

Figure 3A:
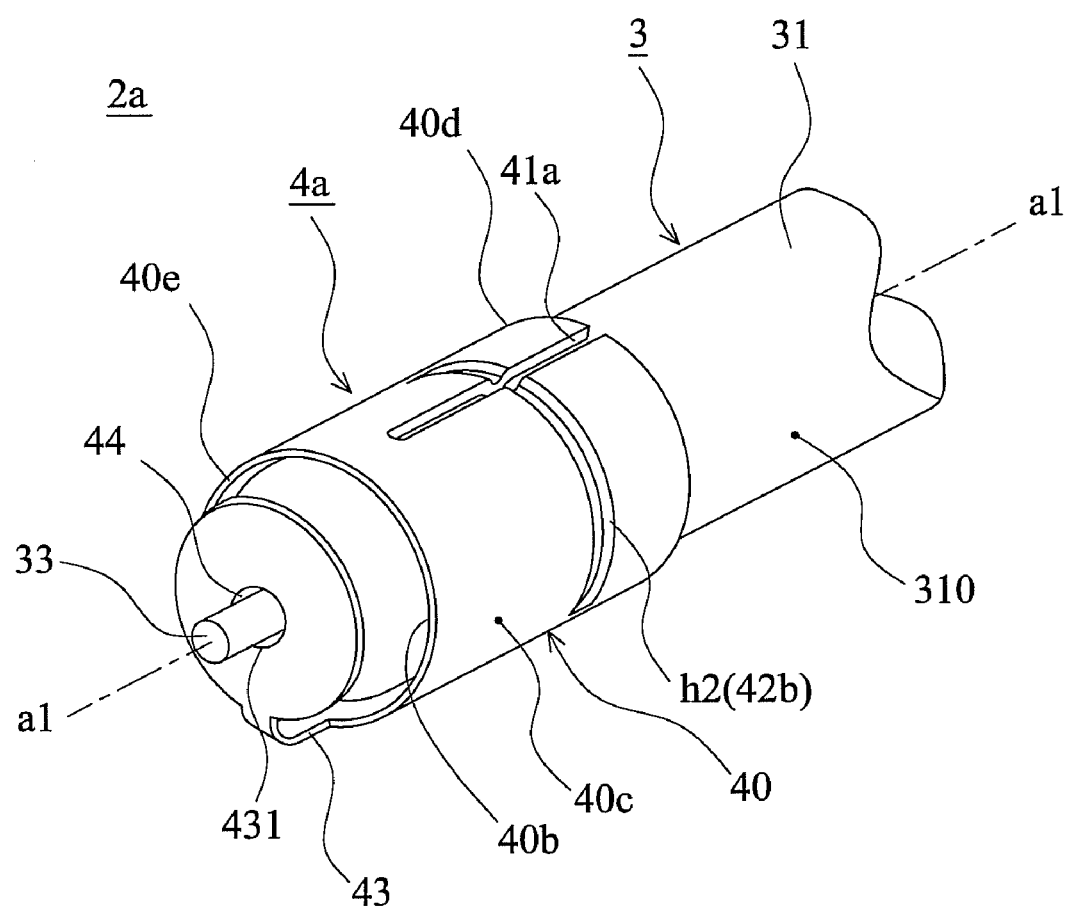
FIG. 3A is a partially schematic sectional view of a light-emitting unit of a second embodiment of the invention.
Figure 3B:
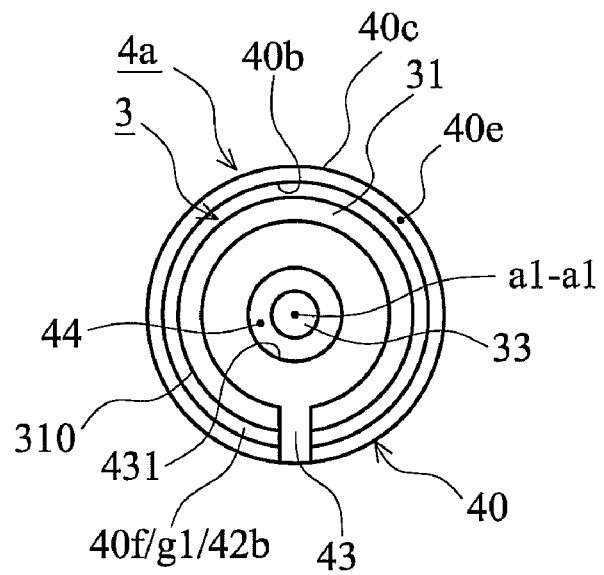
FIG. 3B is a front view of the light-emitting unit of FIG. 3A.
Figure 3C:
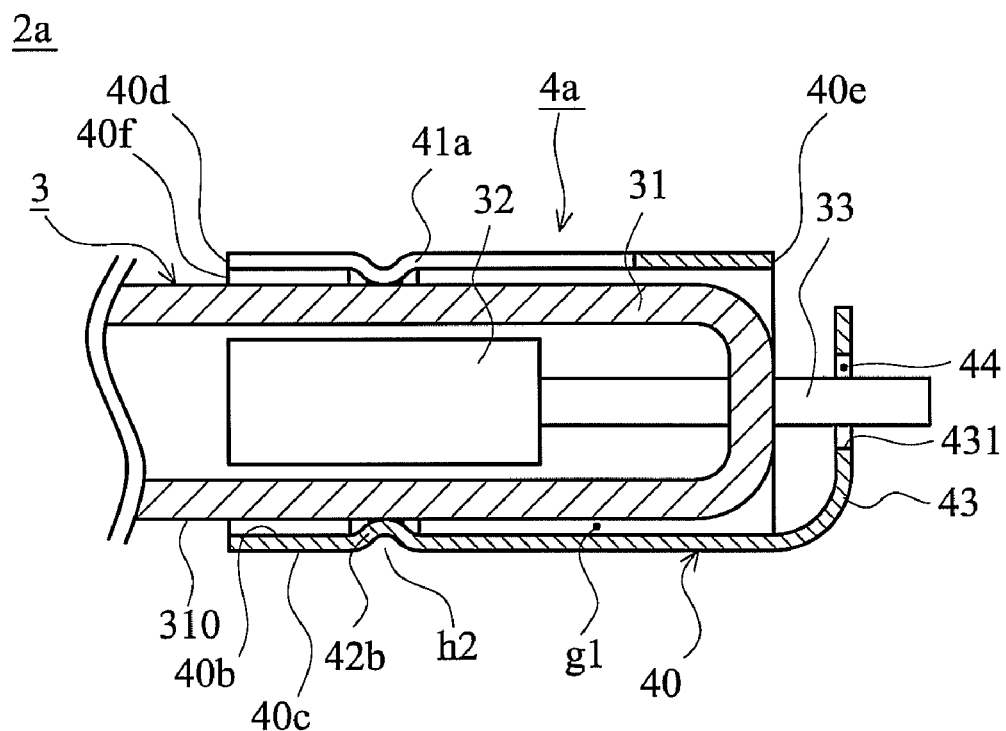
FIG. 3C is a sectional view of the light-emitting unit along an axial line (a1-a1) of FIG. 3A.

FIG. 3A is a partially schematic sectional view of a light-emitting Unit 2a of a second embodiment, FIG. 3B is a front view of the light-emitting unit 2a of FIG. 3A, and FIG. 3C is a sectional view of the light-emitting unit 2a along an axial line a1-a1 of FIG. 3A. Referring to FIGS. 3A-3C simultaneously, the second embodiment differs from the first embodiment in that the abutting portions 42a of the light-emitting unit 2 of the first embodiment is replaced by an annular protrusion h2 of the conductive device 4a of the light-emitting unit 2a. An opening 41a is a straight slot formed along the axial line a1-a1 from the first end 400e11 without penetrating the tubular body 40 completely. The annular protrusion h2 orthogonally intersected with the opening 41b protrudes toward the glass tube 31 to abut against the outer surface 310 of the glass tube 31. In this embodiment, the abutting portion 42b is an annular protrusion. The same structures of the second embodiment as the first embodiment are denoted by the same symbols and the related descriptions are omitted.

Figure 4A:
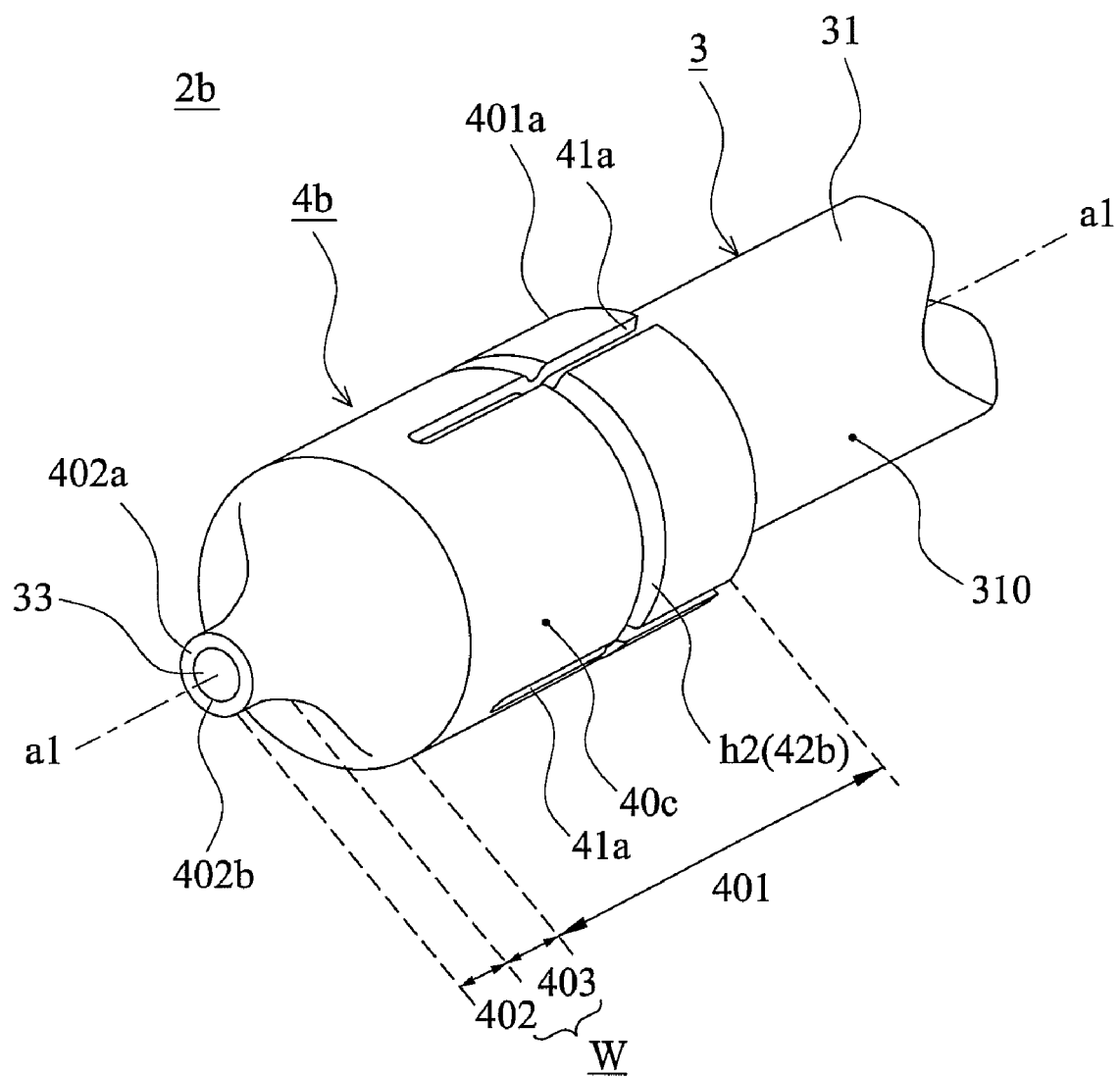
FIG. 4A is a partially schematic sectional view of a light-emitting unit of a third embodiment of the invention.
Figure 4B:
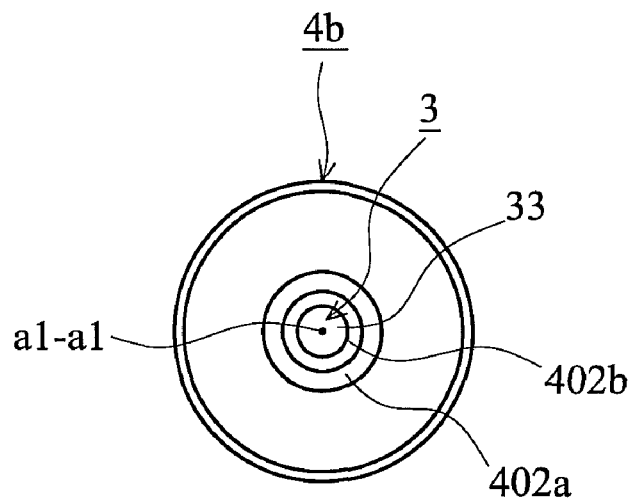
FIG. 4B is a front view of the light-emitting unit of FIG. 4A.
Figure 4C:
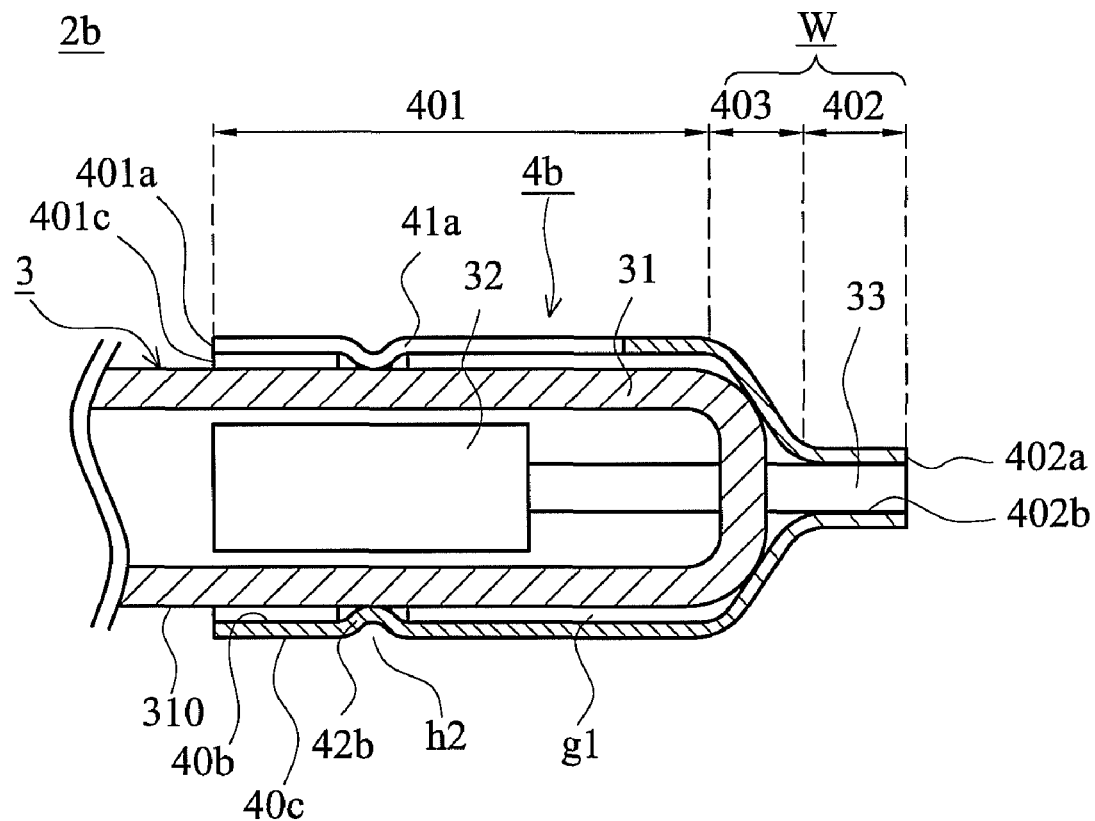
FIG. 4C is a sectional view of the light-emitting unit along an axial line (a1-a1) of FIG. 4A.

FIG. 4A is a partially schematic sectional view of a light-emitting unit 2b of a third embodiment, FIG. 4B is a front view of the light-emitting unit 2b of FIG. 4A, and FIG. 4C is a sectional view of the light-emitting unit 2b along an axial line a1-a1 of FIG. 4A. This embodiment is similar to the first or second embodiments. Referring to FIGS. 4A-4C simultaneously, the light-emitting unit 2b includes a conductive device 4b and the light-emitting component 3. The conductive device 4b includes a first tubular body 401, a second tubular body 402, a neck portion 403 and at least one abutting portion 42b. The second tubular body 402 has a smaller diameter than that of the first tubular body 401, and the neck portion 403 is a curved structure connecting the first and second tubular bodies 401 and 402. The first tubular body 401 has an end 401a, a plurality of openings 41a, a through hole 401c and an annular protrusion 401d. The through hole 401c is formed at the end 401a. The openings 41a is a straight slot formed along the axial line a1-a1 from the end 401a. In this embodiment, the amount of the openings 41a are three The annular protrusion 401d orthogonally intersected with the openings 41a protrudes toward the glass tube 31 for abutting against the outer surface 310 of the glass tube 31. The second tubular body 402 has an end 402a and a through hole 402b formed at the end 402a for allowing the lead wire 33 to pass through the through hole 402b of the second tubular body 402. The neck portion 403 and the second tubular body 402 form a necking structure serving as a conducting portion W. In this embodiment, the amount of the openings 41a is three, and the abutting portion 42b is an annular protrusion.

The glass tube 31 of the light-emitting component 3 abuts against the neck portion 403 of the conductive device 4b, and the abutting portion 42b of the conductive device 4b abuts against the outer surface 310 of the glass tube 31. In this embodiment, the electrical connection of the lead wire 33 of the light-emitting component 3 and the conducting portion W of the neck portion 403 are achieved by welding (e.g., dot welding).

Figure 5A:
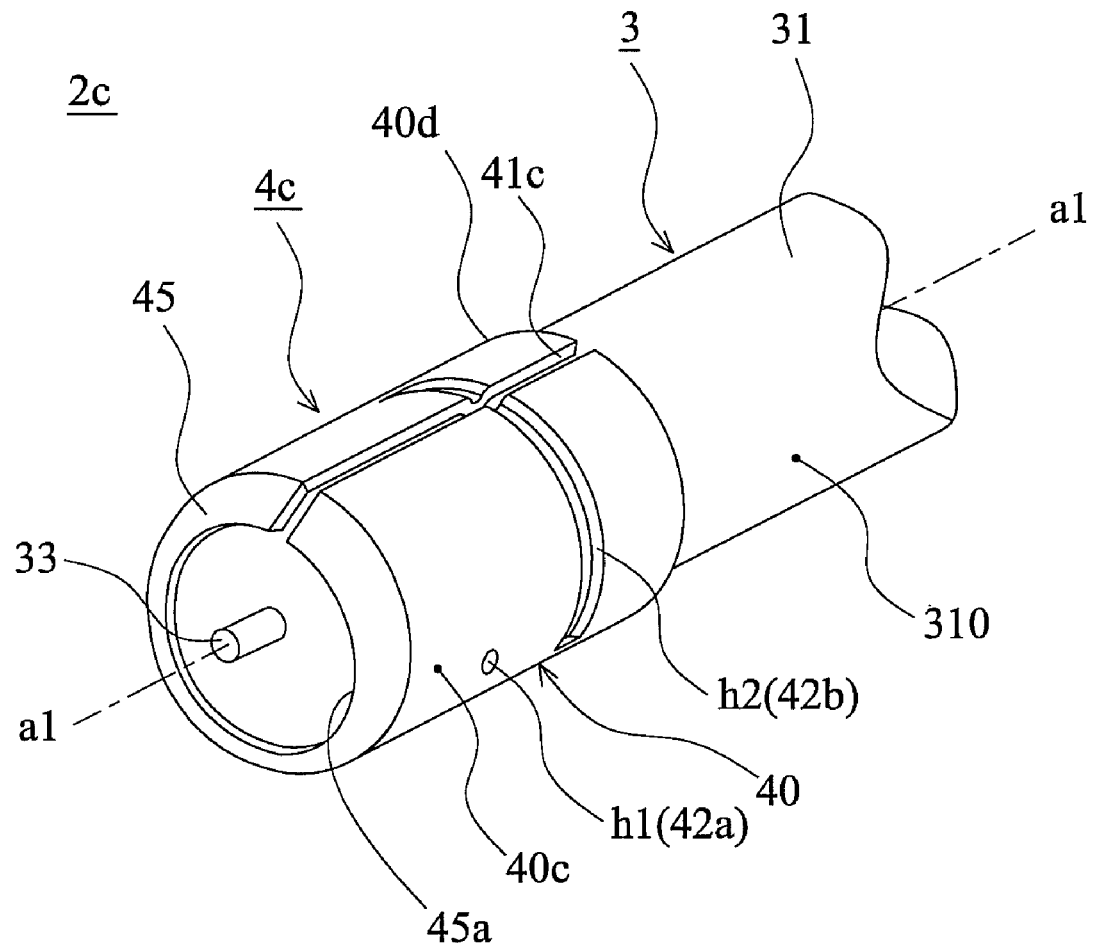
FIG. 5A is a partially schematic sectional view of a light-emitting unit of a fourth embodiment of the invention.
Figure 5B:
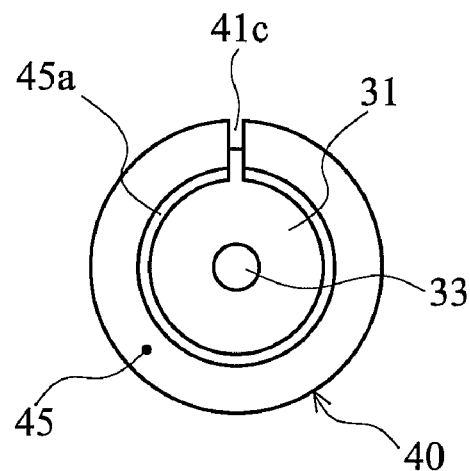
FIG. 5B is a front view of the light-emitting unit of FIG. 5A.
Figure 5C:
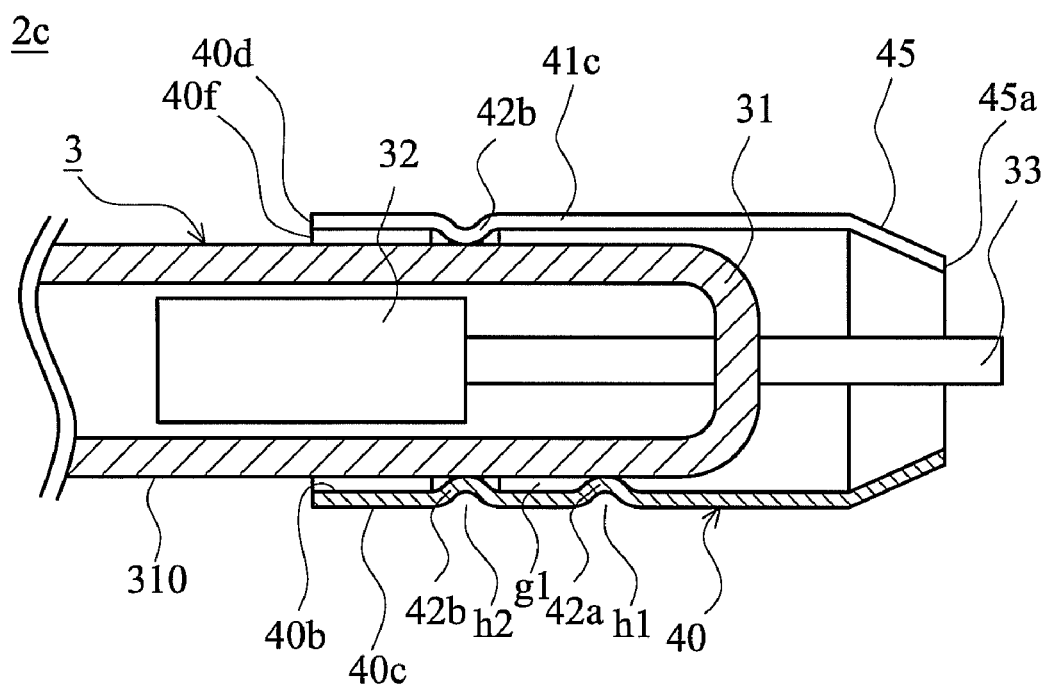
FIG. 5C is a sectional view of the light-emitting unit along an axial line (a1-a1) of FIG. 5A.

FIG. 5A is a partially schematic sectional view of a light-emitting unit 2c of a fourth embodiment, FIG. 5B is a front view of the light-emitting unit 2c of FIG. 5A, and FIG. 5C is a sectional view of the light-emitting unit 2c along an axial line a1-a1 of FIG. 5A. Referring to FIGS. 5A-5C simultaneously, the light-emitting unit 2c includes a conductive device 40 and the light-emitting component 3. Those configurations, which are the same with the above-mentioned embodiments, will not be described in detail any more. The conductive device 4c includes a tubular body 40 and at least one abutting portion 42a and/or 42b. The tubular body 40 has an opening 41c, an inner circumference 40b, an outer circumference 40c, a first end 40d, and a through hole 40f. The through hole 40f is formed in the inner circumference 40b. The abutting portions include at least one annular protrusion 42b or/and at least one rounded protrusion 42a. In this embodiment, the abutting portion includes one annular protrusion 42c and three rounded protrusions 42b. The annular protrusion 42b orthogonally intersected with the opening 41c protrudes toward the glass tube 31 for abutting against the outer surface 310 of the glass tube 31. Any two of the rounded protrusions 42b have an angle θ (120°) therebetween, but is not limited thereto. Alternatively, the abutting portions are two spaced annular protrusions 42c (not shown), thus maintaining the parallelism of the conductive device 4c. The light-emitting unit 2c further includes a tapered portion 45 extended from the end of the tubular body 40 toward the lead wire 33 to form a second end 45a. The opening 41c is a straight slot formed along the axial line a1-a1 from the first end 40d to the second end 45a, thereby providing the tubular body 40 with a flexible C-shaped sectional structure. Thus, a tin solder (not shown in Figs.) can be conveniently wetted on the tapered portion 45 of the light-emitting unit 2c, and the glass tube 31 of the light-emitting component 3 can be prevented from being wetted by the tin solder.

Based on the described features, the light-emitting unit of the embodiment provides a detachably disposed conductive device on the light-emitting component. Thus, the conductive device or the light-emitting component can be individually replaced by a new one when the conductive device or the light-emitting component malfunctions. That is, unlike prior art light-emitting units, the light-emitting unit of the invention is more economical, as the entire light-emitting unit does not have to be replaced, should a malfunction occur in one part of the light-emitting unit. Further, due to the gap formed by the protrusions of the conductive device with respect to the light-emitting component, a space for heat dissipation is increased. Thus, the light-emitting unit of the embodiment increases heat dissipation efficiency and assures long usage lifespan.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A conductive device of a light-emitting unit, wherein the light-emitting unit comprises a light-emitting component, the conductive device comprising:
    a body having an opening and detachably telescoped to one end of the light-emitting component, wherein the opening is a straight slot extending through a thickness of the body formed from one end of the conductive device along a center axial direction of the conductive device for allowing the conductive device to be detachably telescoped to the end of the light-emitting unit; and
    at least one abutting portion abutting against the light-emitting component;
    wherein the conductive device excites the light-emitting component to emit lights via a power source.

2. The conductive device as claimed in claim 1, wherein the light-emitting component comprises a gas discharge tube or a cold cathode fluorescent lamp.

3. The conductive device as claimed in claim 1, wherein the light-emitting component comprises a glass tube, an electrode disposed in the glass tube, and a lead wire connected to the electrode and electrically connected to the conductive device.

4. The conductive device as claimed in claim 3, wherein the abutting portion of the conductive device comprises at least one rounded protrusion or at least one annular protrusion for clamping the glass tube of the light-emitting component.

5. The conductive device as claimed in claim 3, wherein the conductive device further comprises a conducting portion extended from the body and connected with the lead wire by a welding flux.

6. The conductive device as claimed in claim 5, wherein the conducting portion of the conductive device further comprises a through hole for allowing the lead wire to pass through the through hole of the conducting portion to form an annular region therebetween.

7. The conductive device as claimed in claim 6, wherein the conducting portion of the conductive device extends from the body to form an L-shaped structure with the through hole thereon.

8. The conductive device as claimed in claim 3, further comprising—a tubular body with a smaller diameter than that of the body, and a neck portion connecting the body and the tubular body, wherein the tubular body has a through hole for allowing the lead wire to pass through the through hole of the tubular body.

9. The conductive device as claimed in claim 3, wherein the body comprises a C-shaped tubular body.

10. The conductive device as claimed in claim 9, wherein the body comprises a tapered portion extending from the end of the body toward the lead wire.

11. The conductive device as claimed in claim 1, wherein a material of the conductive device comprises a metallic material.

12. The conductive device as claimed in claim 1, further comprising a plurality of patching holes on the conductive device for dissipating heat generated by the light-emitting component.

13. A light-emitting unit comprising:
    a light-emitting component comprising at least one end;
    a conductive device comprising:
        a body having an opening and detachably telescoped to the end of the light-emitting component, wherein the opening is a straight slot extending through a thickness of the body formed from one end of the conductive device along a center axial direction of the conductive device for allowing the conductive device to be detachably telescoped to the end of the light-emitting unit; and at least one abutting portion protruding toward the light-emitting component for abutting against the light-emitting component; and a power source;

wherein the conductive device is utilized to excite the light-emitting component to emit lights via the power source.

14. The light-emitting unit as claimed in claim 13, wherein the light-emitting component comprises a glass tube, an electrode disposed in the glass tube, and a lead wire connected to the electrode and electrically connected to the conductive device.

15. The light-emitting unit as claimed in claim 14, wherein the abutting portion of the conductive device comprises at least one rounded protrusion or at least one annular protrusion for clamping the glass tube of the light-emitting component.

16. The light-emitting unit as claimed in claim 14, wherein the conductive device further extendedly comprises a conducting portion electrically connected to the lead wire of the light-emitting component.

17. The light-emitting unit as claimed in claim 16, wherein the conducting portion of the conductive device further comprises a through hole, and the lead wire passes through the through hole of the conducting portion to form an annular region therebetween.

18. The light-emitting unit as claimed in claim 16, wherein the conducting portion of the conductive device extends from the body to form an L-shaped structure with the through hole thereon for allowing the lead wire to pass through the through hole of the conducting portion to form an annular region therebetween.

19. The light-emitting unit as claimed in claim 14, further comprising a tubular body with a smaller diameter than that of the body, and a neck portion connecting the body and the tubular body, wherein the tubular body has a through hole for allowing the lead wire to pass through the through hole.

20. The light-emitting unit as claimed in claim 14, wherein the conductive device comprises a C-shaped tubular body and a tapered portion extending from the C-shaped tubular body toward the lead wire.

21. The light-emitting unit as claimed in claim 13, wherein a material of the conductive device comprises a metallic material.

* * * * *